US008788419B2

(12) United States Patent
Samuels et al.

(10) Patent No.: US 8,788,419 B2
(45) Date of Patent: Jul. 22, 2014

(54) METHOD AND SYSTEM FOR MITIGATING RISK OF FRAUD IN INTERNET BANKING

(75) Inventors: Maurice Samuels, Round Rock, TX (US); Joseph Bruce, Austin, TX (US); Cindi Lieblich, Dripping Springs, TX (US)

(73) Assignee: First Data Corporation, Greenwood Village, CO (US)

( * ) Notice: Subject to any disclaimer, the term of this patent is extended or adjusted under 35 U.S.C. 154(b) by 1067 days.

(21) Appl. No.: 11/648,066

(22) Filed: Dec. 30, 2006

(65) Prior Publication Data

US 2008/0162338 A1 Jul. 3, 2008

(51) Int. Cl.
*G06Q 40/00* (2012.01)

(52) U.S. Cl.
USPC ............................................. 705/44; 705/42

(58) Field of Classification Search
USPC .................................................... 705/42, 44
See application file for complete search history.

(56) References Cited

U.S. PATENT DOCUMENTS

| | | | |
|---|---|---|---|
| 5,721,780 A | 2/1998 | Ensor et al. | |
| 5,903,882 A | 5/1999 | Asay et al. | |
| 6,389,542 B1 | 5/2002 | Flyntz | |
| 6,687,823 B1 | 2/2004 | Al-Salqan et al. | |
| 6,691,232 B1 | 2/2004 | Wood et al. | |
| 6,711,681 B1 | 3/2004 | Al-Salqan et al. | |
| 6,714,918 B2 | 3/2004 | Hillmer et al. | |
| 6,973,571 B2 | 12/2005 | Lee et al. | |
| 7,100,049 B2 | 8/2006 | Gasparini et al. | |
| 7,100,204 B1 * | 8/2006 | Myllymaki et al. | ............ 726/22 |
| 2002/0049847 A1 * | 4/2002 | McArdle et al. | ............... 709/227 |
| 2004/0187023 A1 * | 9/2004 | Alagna et al. | ................. 713/200 |
| 2005/0268100 A1 | 12/2005 | Gasparini et al. | |
| 2005/0268101 A1 | 12/2005 | Gasparini et al. | |
| 2005/0268107 A1 | 12/2005 | Harris et al. | |
| 2005/0283443 A1 | 12/2005 | Hardt | |
| 2005/0283614 A1 | 12/2005 | Hardt | |
| 2006/0053293 A1 | 3/2006 | Zager et al. | |
| 2006/0075027 A1 | 4/2006 | Zager et al. | |
| 2006/0075028 A1 | 4/2006 | Zager et al. | |
| 2007/0130350 A1 * | 6/2007 | Alperovitch et al. | ......... 709/229 |

(Continued)

OTHER PUBLICATIONS

Digital FCU Uses 'Dynamic Account Modeling' in Battle With Fraudsters.Rapport, Marc. Credit Union Times (1058-7764) 4/15/20. vol. 20,Iss.15;p. 30 available online http://web.ebscohost.com/ehost/pdfviewer/pdfviewer?vid=2&hid=10&sid=d6e9db00-e019-4dd6-bb78-9fdb2e1c10c2%40sessionmgr13, last accessed May 9, 2001.*

(Continued)

*Primary Examiner* — Behrang Badii
*Assistant Examiner* — Daniel L Greene
(74) *Attorney, Agent, or Firm* — Sutherland Asbill & Brennan LLP

(57) ABSTRACT

A method and system are provided for mitigating the risk of fraud in Internet banking. In an embodiment comprising an end user seeking access to the Internet banking site of a financial institution, the end user having already satisfied a first authentication requirement (such as providing a valid user ID and password), the end user is required to satisfy a second authentication test when a measure of improbability associated with the login exceeds a threshold. The measure of improbability, in an embodiment, is based on the improbability of a combination of session statistics such as IP address, browser ID, hour of day, and time since the user's last valid login.

20 Claims, 6 Drawing Sheets

(56) References Cited

U.S. PATENT DOCUMENTS

2007/0130351 A1* 6/2007 Alperovitch et al. ......... 709/229
2007/0136573 A1* 6/2007 Steinberg ..................... 713/155
2007/0143827 A1* 6/2007 Nicodemus et al. ............. 726/2
2007/0143851 A1* 6/2007 Nicodemus et al. ........... 726/25
2007/0266257 A1* 11/2007 Camaisa et al. ............. 713/182

OTHER PUBLICATIONS

Trupin, Jerry. Spear-Phishing. Insurance Advocate (0020-4587) 1/12/20. vol. 120,Iss.1;p. 34 Source: Business Source Complete, available online @ http://web.ebscohost.com/ehost/pdfviewer/pdfviewer?vid=2&hid=10&sid=1b0fde79-aed9-4625-9f17-4cec1ddb355b%40sessionmgr10,last accessed May 9, 2001.*

"Making Login Services Independent of Authentication Technologies." Samar, Vipin, and Charlie Lai. Sunsoft, Inc., Proceedings of the Sun Soft Developers Conference Mar. 1996.

"Solaris 10 Operating System-Unparalleled Security to Enable and Protect Business." A Technical White Paper Sep. 2004, www.sun.com/software/whitepapers/Solaris10/s10security.pdf.

"Intrusion Detection Systems: A Survey and Taxonomy," Technical Report No. 99-15, Dep't of Computer Engineering, Chalmers University of Technology, Sweden, Mar. 2000.

Teresa F. Lunt et al., "A Real-Time Intrusion-Detection Expert System (IDES)." SRI International, Final Technical Report. Feb. 28, 1992. 166 pages.

* cited by examiner

| | A | B | C | D | E | F | G | H | I | J | K | L | M | N |
|---|---|---|---|---|---|---|---|---|---|---|---|---|---|---|
| 1 | Access ID | Hold | Customer name | Phone | Email address | First access date | Login Time | Login IP | IP country | Score at login | Hour | Network | Browser | Frequency |
| 2 | JoeDoe | | Joe Doe | 509-944-4709 | blt@foo.com | 6/22/2004 | 6/11/2006 22:10 | 65.245.16.89 | Lebanon | 8.761 | 10 | 10 | 10 | 5.046 |
| 3 | applepie | | Jane Williams | 509-287-4159 | blt@foo.com | 12/15/2004 | 6/11/2006 20:46 | 71.28.4.151 | United States | 7.79 | 6.64 | 10 | 10 | 4.517 |
| 4 | wiggins93 | | Mike Wiggins | 565-505-1058 | blt@foo.com | 4/25/2005 | 6/11/2006 8:30 | 74.35.26.93 | United States | 6.118 | 4.64 | 5.059 | 6.644 | 8.125 |
| 5 | CoopTools1 | | Cooperative Tools | 509-944-4616 | blt@foo.com | 6/17/2003 | 6/11/2006 11:26 | 12.17.6.214 | United States | 5.432 | 5.06 | 6.644 | 6.644 | 3.381 |
| 6 | mary23 | | Mary Johnson | 509-887-4047 | blt@foo.com | 7/27/2005 | 6/11/2006 22:38 | 74.32.44.210 | United States | 5.322 | 3.1 | 10 | 0.097 | 8.095 |
| 7 | mary23 | | Mary Johnson | 509-887-4047 | blt@foo.com | 7/27/2005 | 6/11/2006 22:21 | 74.32.244.10 | United States | 5.307 | 3.1 | 10 | 0.097 | 8.036 |
| 8 | friedbear68 | | Frieda Kelp | 509-502-9006 | blt@foo.com | 7/30/2004 | 6/11/2006 9:13 | 216.15.27.42 | United States | 5.135 | 4.59 | 0.041 | 6.17 | 9.745 |
| 9 | oneillRus | | Joga Burrito | 509-944-8250 | blt@foo.com | 4/27/2003 | 6/11/2006 8:13 | 12.27.170.132 | United States | 5.094 | 3.02 | 0.124 | 10 | 7.232 |
| 10 | wiggins93 | | Mike Wiggins | 565-505-1058 | blt@foo.com | 4/25/2005 | 6/11/2006 8:22 | 74.36.26.93 | United States | 5.084 | 4.64 | 5.059 | 6.644 | 3.991 |
| 11 | burgersRdone | | Sally Burger | 509-256-5675 | blt@foo.com | 9/14/2005 | 6/11/2006 20:09 | 216.17.17.102 | United States | 4.84 | 4.54 | 1.271 | 3.544 | 10 |
| 12 | donutsyum | | Sharon Donut | 509-441-5881 | blt@foo.com | 12/1/2003 | 6/11/2006 20:40 | 12.207.22.186 | United States | 4.794 | 4.06 | 0.377 | 6.644 | 8.095 |
| 13 | fignewtons6 | | Mike Newton | 565-459-5067 | blt@foo.com | 7/18/2005 | 6/11/2006 7:18 | 12.206.68.21 | United States | 4.722 | 10 | 0 | 0 | 8.888 |
| 14 | mowlawns8 | | Lindsey Wellman | 509-522-5587 | blt@foo.com | 3/29/2003 | 6/11/2006 22:59 | 216.75.30.87 | United States | 4.676 | 10 | 0 | 5.059 | 3.644 |

FIG. 6

METHOD AND SYSTEM FOR MITIGATING RISK OF FRAUD IN INTERNET BANKING

FIELD

Embodiments described herein relate to a method and system for mitigating the risk of fraud in Internet banking.

BACKGROUND

The field of Internet banking services, i.e., services that enable banking transactions, bill payments, and the like over the Internet through a financial institution's secure web site, is growing rapidly. Ease of use and convenience contribute to this rapid growth. Internet banking (also known as online banking) allows customers to satisfy their banking needs anytime (even when "brick and mortar" branches are closed) and anywhere that Internet access is available. In most cases, no special hardware or software is needed; all that is required is a web browser (such as Internet Explorer) and an Internet connection.

Preventing fraud is a matter of paramount concern in Internet banking, and proper authentication, the process of verifying the identity of a person or entity, is essential to mitigating the risk of fraud. Customer authentication generally involves checking for things such as (i) something a person knows (e.g., a password, Personal Identification Number, or shared secret), (ii) something a person has (for example, a digital certificate using a Public Key infrastructure or a physical device such as an ATM card, a smart card, a USB token device or dongle, or a one-time password-generating token), and (iii) something a person is (for example, biometric features such as a fingerprint).

Internet banking user interfaces typically are secure sites (generally employing the https protocol) so that all information traffic, including the password, is encrypted, making it next to impossible for a third party to obtain or modify information after it is sent. However, encryption alone does not prevent bad actors from misappropriating passwords through brute force cracking methods, illicit surveillance, "malware" or other tools to intercept a password as it is entered on an insecure computer, pharming (redirecting an individual's web request to another location), phishing (the act of sending an email to a user falsely claiming to be an established enterprise in an attempt to scam the user into surrendering private information), social engineering, or unauthorized access to password store facilities. Consequently single-factor authentication, such as the password used in many corporate computing environments, is considered inadequate for highly sensitive banking transactions involving access to customer information or the movement of funds to other parties.

The federal banking regulators in the United States have directed financial institutions to implement multifactor authentication, layered security, or other controls reasonably calculated to mitigate the risks of fraud and/or malicious misappropriation of passwords. Such controls preferably will include a multi-factor authentication method and system coupled with an intrusion detection system, i.e., a method and system for identifying persons attempting to use a misappropriated password to access the Internet banking system.

There are disadvantages associated with use of "something the customer has" as an authentication factor for use in Internet banking transactions. Biometric readers typically include specialized equipment which is expensive to install, costly to maintain, and tends to limit the consumer's choices of where to access the Internet banking services. Requiring the customer to use a digital certificate or hardware token decreases ease of use and increases installation and maintenance costs. All of these disadvantages detract from the core benefits of Internet banking: ease of use and convenience. Research confirms that many consumers prefer other authentication measures (such as challenge questions) over hardware tokens. What is needed is a method and system for mitigating the risks of fraud in Internet banking that balances the ease of use and convenience advantages of Internet banking with reasonably effective security precautions.

An intrusion detection system can be a valuable part of any system of controls intended to detect and deter fraudulent use of Internet banking services. Generally speaking, intrusion detection systems utilize two major principles: anomaly detection, which relies on flagging anomalous or abnormal behavior, and signature detection, which flags behavior that corresponds to previously-defined pattern signatures of known intrusions. A signature detection system, however, may not be able to detect novel intrusion pattern signatures. One problem with anomaly detection is that there may be a high rate of false positives (i.e., falsely indicating the presence of a potential intruder), which require time and effort to sort out and may affect the ease and convenience of the Internet banking services. What is needed is an application intrusion detection system that balances the ease of use and convenience advantages of Internet banking with reasonably effective security precautions.

SUMMARY

A method and system are provided for mitigating the risk of fraud in Internet banking. In an embodiment, an end user requests access from a remote site to the host site for the Internet banking services of a financial institution and satisfies an initial authentication requirement, preferably comprising providing a valid user ID and password associated with a known customer of the financial institution. The login request includes several attributes, including in an embodiment an Internet protocol (IP) or other Internet network address for the remote site, a browser ID for the user's browser, the time of day, and the time since the last logon. The improbability of individual attributes of the current login request is calculated, and a composite score is created that measures the improbability of several of the attributes. If the composite score exceeds a threshold of improbability, an additional authentication method is required before the user receives access to the Internet banking host site. In an alternative embodiment, the user receives access to the web site, but has to satisfy the additional authentication requirement before receiving access to particular transaction pages. In an embodiment, reports are provided to the financial institution to identify unusual login activity, on a regular basis (e.g., daily) and in real time.

A method is provided which, in an embodiment, comprises the steps of receiving from a remote site a request for access to a financial institution's Internet banking site, said request having satisfied a first authentication requirement associated with a customer of the financial institution and said request having two or more attributes, calculating a score corresponding to a measure of the improbability of the occurrence of at least two of the attributes, and conditioning approval of the request on satisfaction of a second authentication requirement if the score exceeds a configurable threshold. In an alternative embodiment, the method comprises the steps of receiving from a remote site a request for access to a financial institution's Internet banking site, determining that the request is unusual based on the improbability of occurrence of a plurality of attributes of the request, and reporting the request to the financial institution.

A system is provided which, in one embodiment includes a server and an authentication module that receives a request for access to a financial institution's Internet banking site, determines whether the request is unusual based on the improbability of occurrence of the attributes of the request, and reports the unusual request to the financial institution. An alternative embodiment of the system comprises a session statistics module, which computes an improbability measure of the attributes of the request, an additional authorization module, which requires satisfaction of two or more authentication requirements if the improbability measure exceeds a configurable threshold, and optionally a reporting module to report session attributes and improbability measures to the financial institution. Further alternative embodiments include a system comprising a server and memory and a computer-readable storage medium containing instructions to perform the steps of the methods described herein.

BRIEF DESCRIPTION OF THE DRAWINGS

FIG. 6 is an image of an exemplary version of a daily unusual login activity report according to an embodiment of the invention.

DETAILED DESCRIPTION OF PREFERRED EMBODIMENTS

At least three parties will be involved in an Internet banking transaction according to an embodiment: a financial institution such as a bank or a credit union, a host entity that hosts an Internet banking site for the financial institution, and a customer of the financial institution (also referred to as an "end user") who uses the financial institution's Internet banking services. Those of skill in the art will recognize that the host entity might host Internet banking sites for multiple financial institutions simultaneously, or that a financial entity could host its own Internet banking site.

Figure 1:
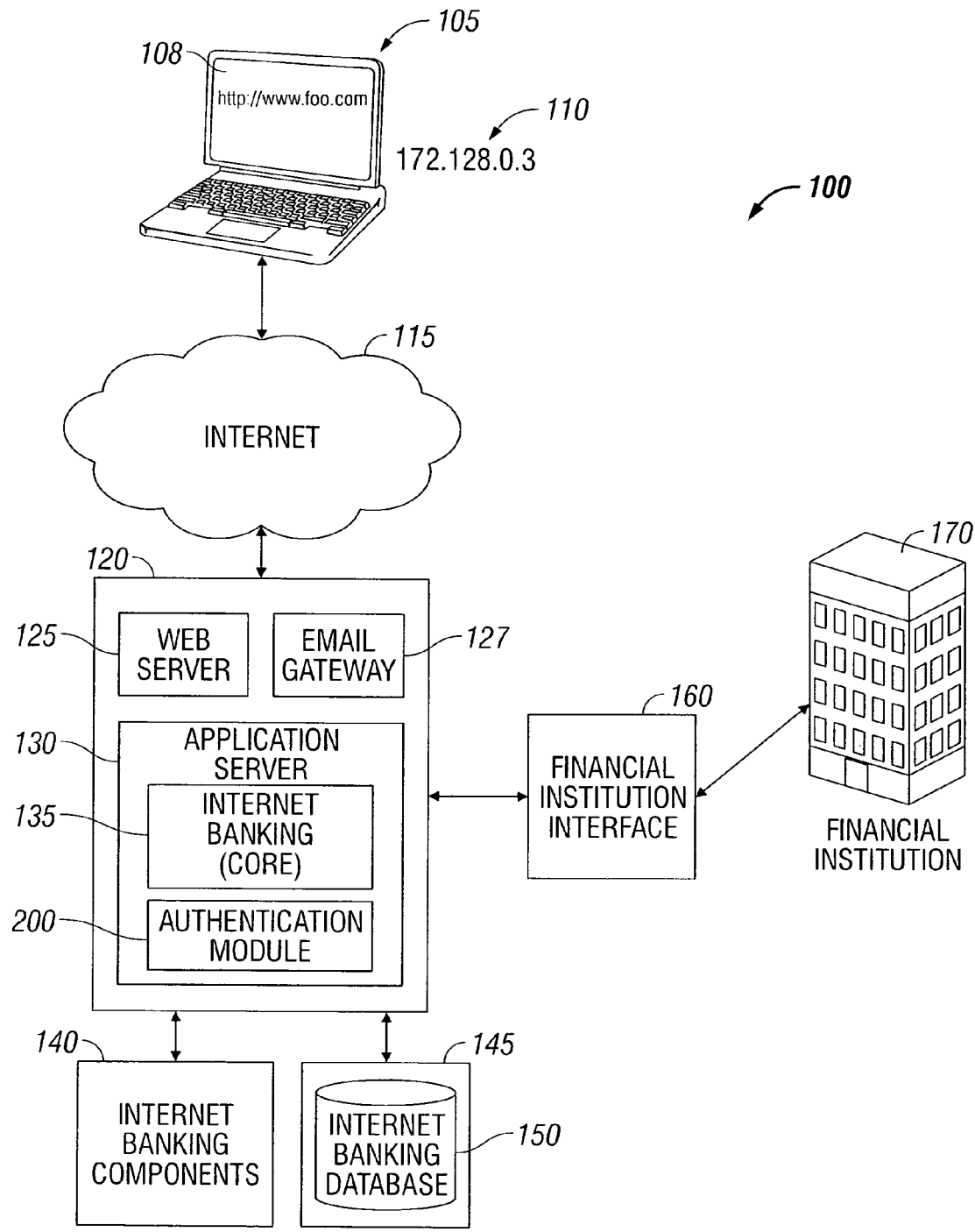
FIG. 1 depicts a high level view of an Internet banking system according to an embodiment of the invention.

As depicted in FIG. 1, an Internet banking system 100 according to an embodiment includes a host site 120 with a web server 125 and an email gateway 127 connected to the Internet 115 or a local area network or other network using routing and communication protocols (such as TCP/IP or Ethernet), and software and hardware (comprising one or more processors, memories, storage devices, routers, and switchers) familiar to those of ordinary skill in the art. An end user accesses the host site 120 using browser 108 from a remote site 105 which preferably is a personal computer with an Internet connection but can be any other device capable of remotely accessing the host site 120, including a computer coupled to a local area network, a dumb terminal, a web appliance, a cell phone, a BlackBerry™ or a personal digital assistant (PDA). One end user might remotely access the host site 120 from more than one different remote site; conversely a plurality of different end users may use the same remote site to access the Internet banking system. The link between the remote site 105 and the host site 120 preferably is secured through the use of Hypertext Transfer Protocol (HTTP) interaction over an encrypted Secure Sockets Layer or Transport Layer Security transport mechanism (HTTPS), although other means of providing a secure connection (such as a virtual private network) may also be used.

Remote site terminal 105 is associated with a unique network address 110, such as an Internet protocol (IP) address, that identifies a high level network associated with the address, such as the Class A, B and C networks identified in the first octet of an IP address in version 4 of the IP protocol.

Browser 108 preferably is an Internet browser (such as Microsoft Internet Explorer version 6.0 or greater, Netscape Navigator or Safari) or other software that enables secure bi-directional communication with a remote site over the Internet 115 or other network. Preferably communications from the browser 108 to the host site 120 sends unique identifying information (also referred to as a footprint, a browser ID, or a user agent string) such as the brand of the browser, its version number, or the type of hardware or software platform on which the browser runs.

Host site 120 communicates with the financial institution 170 through a financial institution interface 160. Host site 120 preferably includes application server 130, including core Internet banking module 135 and authentication module 200. The system includes other components of the Internet banking system 140, including a database server 145 containing Internet banking database 150. In an embodiment, the components of the application server 130 are Perl virtual machines.

Figure 2:
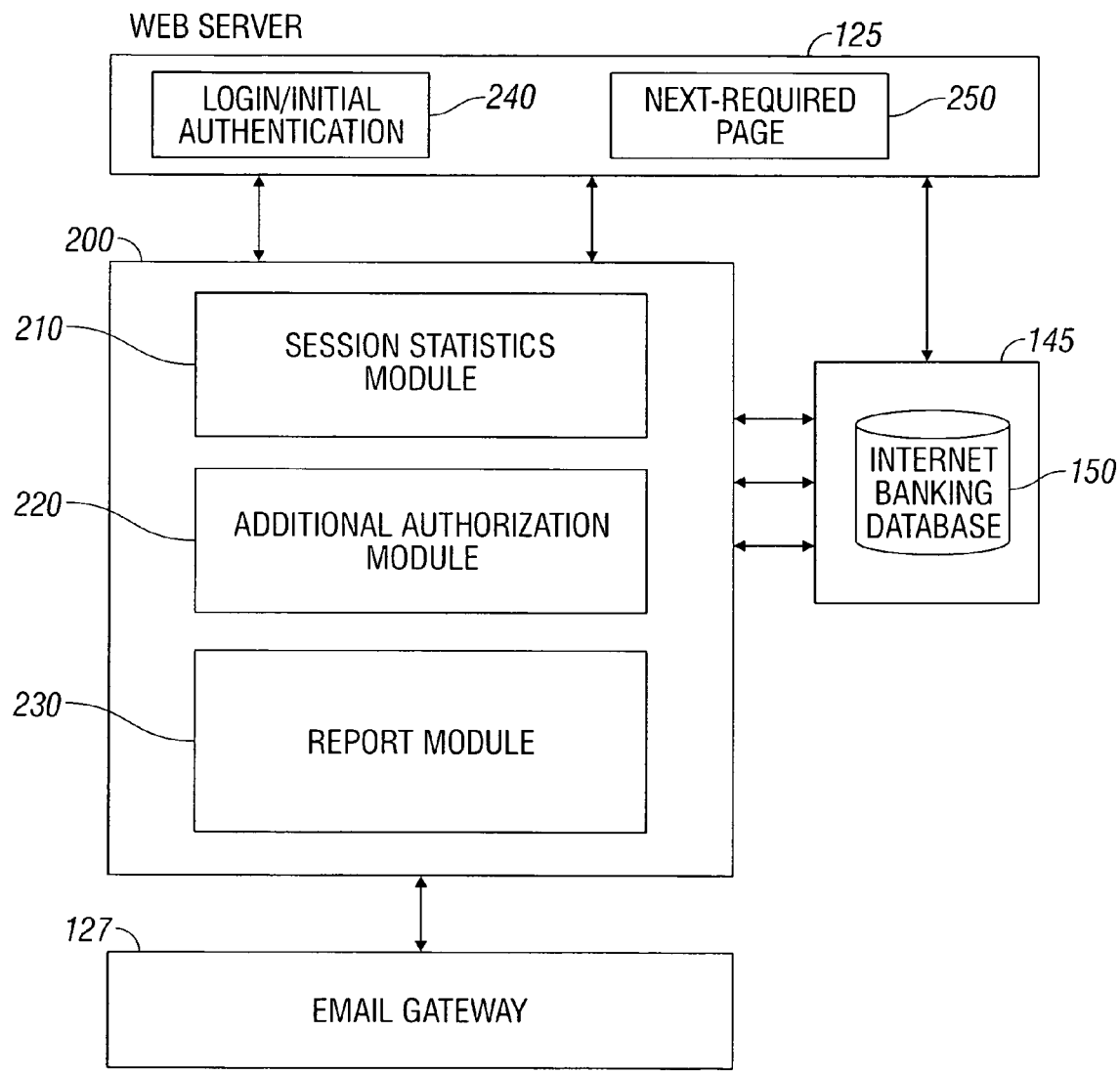
FIG. 2 depicts a high level view of the components of a system for implementing intruder detection and multi-factor authentication in Internet banking according to an embodiment of the invention.

FIG. 2 depicts a high level view of the functional components of authentication module 200, preferably including Session Statistics module 210, Additional Authorization module 220, Report module 230, Login/Initial Authentication module 240 and Next-Required Page module 250. Session Statistics module 210 records an end user login (or other initial authentication requirement), records the number of clicks in an end user session, computes the score at login (as described below in connection with step 306), and formats the unusual activity reports. Additional Authorization module 220 determines which additional authentication, if any, is required for an end user (based on institution and customer settings and weighted score at login), gathers data for and sends an immediate report of an unusual login, sends a one-time security code to the customer through email gateway 127, verifies a customer response (one-time security code or question), and determines whether a customer is locked out of additional authentication. Report module 230 determines which report complexity should be sent, if any, to the institution, and gathers data for and sends regular reports. Next-Required Page module 250 determines whether a given web page request by a logged-in end user should be responded to with the requested page, or another ("required") page such as an additional authentication prompt or a "nag" page requesting/requiring that the end user define an email address and security question and answer. Login/Initial Authentication module 240 handles the processing of the login request, including verifying that the user ID and passcode are valid and non-disabled and conform to a customer of the financial institution 170. In an embodiment, an Oracle table session_to_customer associates an end user with a string identifying a session when the end user enters a correct passcode. The end user's web browser holds an encrypted version of the session string, so future requests that are part of the same session are associated with the end user. The existence of the session string indicates that the end user has provided a valid user ID and passcode and thus satisfied a first authentication requirement. Those of skill in the art will appreciate that there are other ways to establish and remember that a user has satisfied a first authentication requirement.

In an embodiment, Internet banking database 150 is an Oracle SQL database that maintains the data required by the Internet banking system for each financial institution and each end user customer of each financial institution. Data is organized in database 150 in logical units called tables. In an embodiment, the tables that are used include tables for customer, session_statistics, customer_properties, high_volume_ip_networks, session_statistic_formula, and institution_properties. A more detailed description of the data stored in each table follows. Those of ordinary skill in the art will understand that the data could be organized in numerous other ways and could be stored in one place or distributed over a network.

The customer table, in an embodiment, contains mandatory information about each end user of each financial institution in Internet banking system 100, including the email_address (the end user's email address), verify_challenge (the security question), verify_response (the user's response to the security question), first access date (i.e., the date the customer first accessed the Internet banking system), and a disabled_status flag (which indicates whether a user ID has been disabled, thus preventing access to the Internet banking system).

The customer_properties table, in an embodiment, contains customer-level options for each end user including: what type of additional authentication method has been selected by the customer and flags to indicate whether to always require additional authentication from the end user, whether to never require additional authentication, or whether to suspend the additional authentication requirement for the next login only.

The high_volume_ip_networks table keeps track of the possible large Internet networks that might be associated with more than one end user, and includes identifying information for the network (such as the octets of the IP address), the CIDR size of the network, a descriptive name for the network, and flag data indicating whether the network is related to or trusted by the host site.

The session_statistic_formula table contains weights to be assigned to the four subscores for creating the composite score described below in connection with step 306 and configuration data for the format of the reports preferred by each financial institution, including hour of day, IP address, browser, interval, minimum score to be given additional authentication, and minimum score for a commercial customer to be given for an additional authentication. In an embodiment, the financial institution can create rules that compute scores based on different combinations of session statistics, and the session_statistic_formula table also remembers the ordering of the rules on the report and the title of the rule.

The institution_properties table contains options for each financial institution that is included in the system, including the following: whether to require an additional authentication for each login; whether to require the customer to have his or her email_address, verify_challenge (security question), and verify_response (response to the security question) set if the institution supports additional authentication; whether to require additional authentication at login, or before proceeding with designated transactional pages such as transfers, cash management, bill pay, or financing; and priority ranking of additional authentication methods. For each of these, the table also indicates whether the option is not required (or overridden) for commercial customers of the financial institution. This table also includes settings for the complexity of the immediate unusual login activity report.

An embodiment uses session statistics as authentication attributes to compare attributes of a login by a particular user ID with previous logins by the same user ID. The session_statistics table contains pre-login statistics including, preferably, login_time (date and time of login), browser_id (browser footprint with a hash of User-Agent string), and IP address (the IP address from which the customer accesses the Internet banking system, which includes information about the network and subnetwork containing the IP address), the presence of a persistent cookie (i.e., a cookie that remains on the end user's computer from session to session) or other device ID, a referrer ID (the Internet address of a referring site) and also, preferably, post-login statistics including last_time (date/time of logout or last click, which can be used to determine the duration of a session), and clicks (number of clicks by the end user within a session). In an embodiment, the session statistics table contains the login session history for each end user for a configurable number of previous transactions, preferably 100.

Research shows that the statistics maintained in the session_statistics table correlate reasonably well with predictable patterns of actual usage of Internet banking services and thus can be used with confidence to detect unusual login activity. Analysis of data relating to all Internet banking transactions of a particular financial institution, using, for example, data mining or other query techniques known to those of skill in the art, may reveal that other statistics can be reliably associated with valid or invalid logins.

Those of skill in the art will recognize that other embodiments may maintain or use other authentication attributes in addition to, or in lieu of, some or all of the session statistics described herein, including data indicating something the customer has (smart cards, tokens, certificates), something the customer is (biometric readers), or other indicia of authentication known to those of skill in the art.

Figure 3:
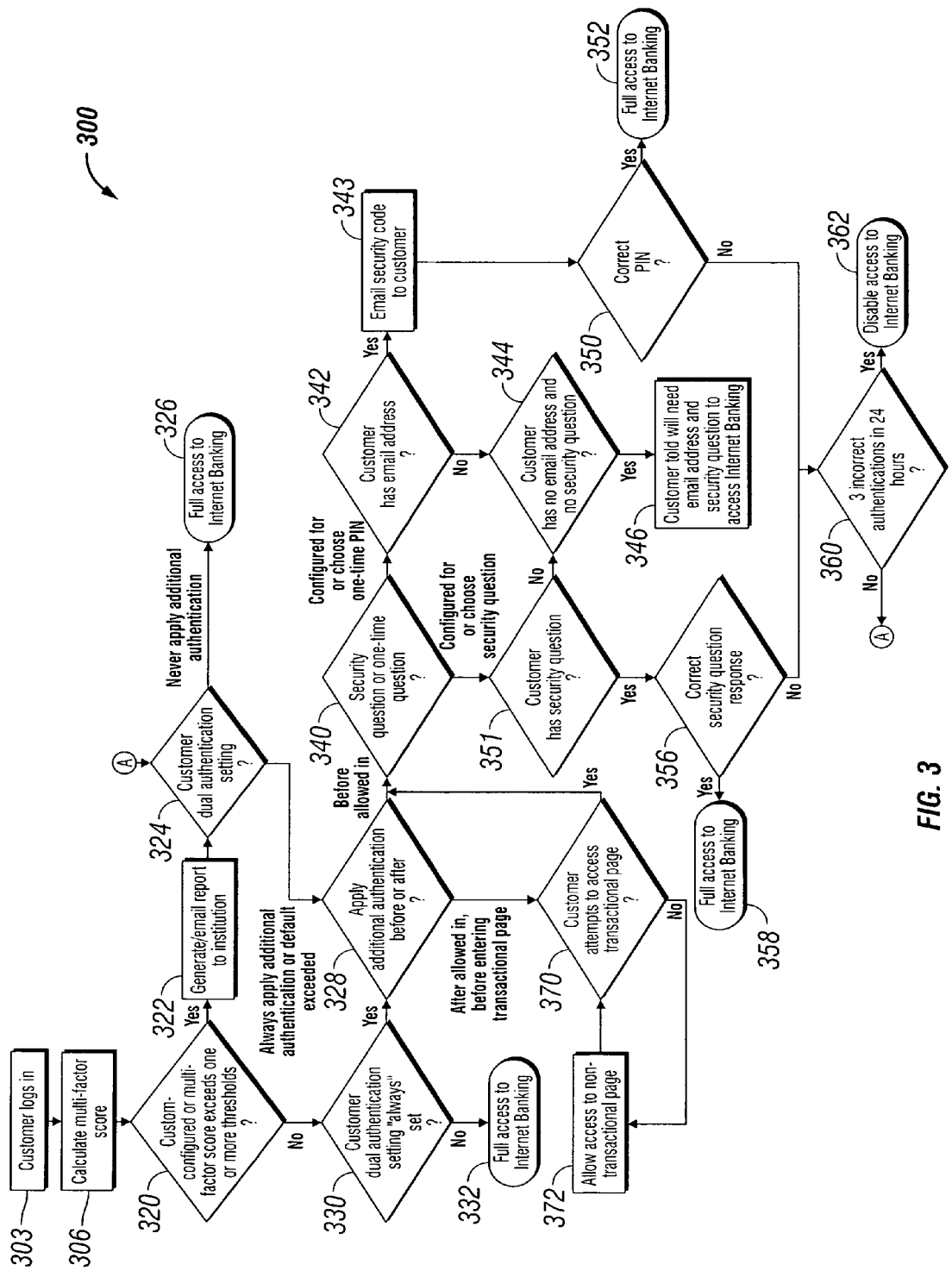
FIG. 3 is a flow chart showing the steps of evaluating and reacting to a customer login according to an embodiment of the invention.

FIG. 3 depicts a flow chart showing the steps of evaluating and reacting to a customer login according to an embodiment. The process preferably begins with a login step 303 in which an end user, using browser 108 from remote site 105 at Internet address 110, initiates a session by establishing a secure link with web server 125 (preferably using HTTPS) and obtains access to Internet banking host site 120 by satisfying an initial authentication requirement. The initial authentication requirement preferably requires providing a user ID and valid passcode (or password) associated with a customer of the financial institution 170. In an embodiment passcode digests, which correlate customers of the financial institution with hashed values of user IDs and passwords, are maintained in a customer passcode table. Those of skill in the art will appreciate that other tests can be used to satisfy an initial authentication requirement. At this step the system preferably checks to ensure that the user ID is not disabled (by, for example, repeated failures to satisfy additional authentication tests, as described in step 360 below). Step 306 is next if the user ID is not disabled. Those of skill in the art will perceive that the host site 120 can require satisfaction of the initial authentication requirement as a precondition of access to the host site 120 or access can be freely granted with deferral of the initial authentication requirement.

In step 306, a composite score is computed which compares the session statistics of the current login with session statistics for previous sessions of the current user ID to determine a measure of the improbability of the attributes for the current session. The detailed steps of creating a composite score in step 306 according to an embodiment are shown in FIG. 4.

Figure 4:
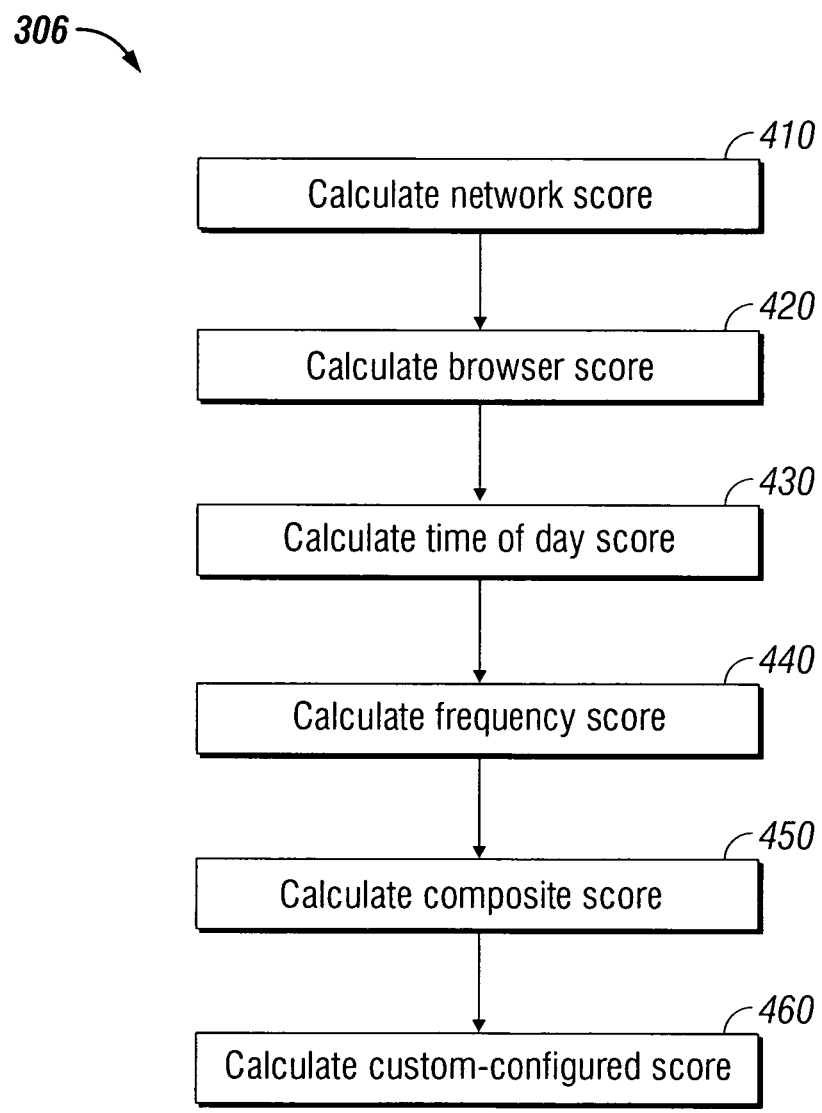
FIG. 4 is a flow chart showing the steps of calculating a composite score of authentication attributes according to an embodiment of the invention.

In step 410 of FIG. 4, a Network Score is calculated according to an embodiment. Although some customers will access the Internet banking system from a static IP address, others will access the Internet banking system from IP addresses that are dynamic within a network, although the network itself remains static. For example, in a current configuration of the Internet service America Online (AOL), an AOL user may be dynamically assigned an IP address within several different ranges of subnetworks of network 172.xxx.xxx.xxx, but each access request that comes from an AOL subscriber comes from IP network. Thus the first step in calculating the Network Score is identifying the network value IPN. The network value IPN is the largest network that (i) contains the IP address of the current user and (ii) has multiple historical logins (which uses the information about high volume networks maintained in the high_volume_login IP table). The second step is to compute N(IPN), which is the number of times that a historical login originated from IPN and can be determined from the IP Address statistics maintained in the session_statistics table. The third step is to compute the empirical probability p(IPN) of this network appearing. If SN is the number of historical samples of logins and MAX(x,y) refers to the maximum of x and y, P(IPN) preferably is calculated to be the maximum of $1/1024$ and N(IPN) divided by SN:

$$p(IPN)=MAX(1/1024, N(IPN)/SN)$$

In an embodiment, the Network Score is a measure of the improbability of the IP network observed at login, and is calculated as the maximum of 10 and the negative logarithm base 2 of p(IPN):

$$\text{Network Score}=MIN(10,-(\log_2(p(IPN))))$$

In step 420 of FIG. 4, a Browser Score is calculated according to an embodiment. The Browser value B is the browser ID. First N(B), which is the number of times that a previous login by this user ID included the browser ID B, is computed using the browser ID statistics maintained in the session_statistics table. The second step is to compute the empirical probability p(B) of Browser B appearing. If S is the number of historical samples of logins, P(B) preferably is calculated to be the maximum of $1/1024$ and N(B) divided by S:

$$p(B)=MAX(1/1024, N(B)/S)$$

In an embodiment, the Browser Score is a measure of the improbability of occurrence of the Browser ID observed at login, and is calculated as the minimum of 10 and the negative logarithm base 2 of p(B):

$$\text{Browser Score}=MIN(10,-(\log_2(p(B))))$$

In step 430 of FIG. 4, a Time of Day Score is calculated according to an embodiment. The calculation starts with a determination of the number H, which is the hour of the day (0 to 24) of the current session. Then, N(H), which is the number of times that a historical login previously occurred at hour H, and which can be determined from the login_time statistics maintained in the session_statistics table, is computed. The empirical probability p(H) of a login occurring at hour H is then computed. If S is the number of historical samples of logins, P(H) preferably is calculated to be the maximum of $1/1024$ and N(H) divided by S:

$$p(H)=MAX(1/1024, N(H)/S)$$

In an embodiment, the Time of Day Score is a measure of the improbability of the login_time statistic observed at login, and is calculated as the maximum of 10 and the negative logarithm base 2 of p(H):

$$\text{Time of Day Score}=MIN(10,-(\log_2(p(H))))$$

In step 440 of FIG. 4, a Frequency Score is calculated according to an embodiment. The calculation starts with the Time Since Last Login statistic D, which refers to the number of days since the last login, and can be calculated by calculating the time elapsed between login time and the last time value stored in the session_statistics table. The next step is to retrieve the number Since Last Mean (SLM) which is calculated as the statistical mean of the difference between the login_time and last_time statistics stored in the session_statistics table for all previously recorded sessions for this user ID. The empirical probability of the Time Since Last Login statistic (p(D)) preferably is calculated as 1 minus e raised to the power of negative D divided by SLM:

$$p(D)=1-e^{-D/SLM}$$

In an embodiment, the Frequency Score is a measure of the improbability of the difference between the login_time and last_time values observed at login. In an embodiment of the invention, this number is calculated as the minimum of 10 and the negative of the logarithm base 2 of the minimum of p(D) and 1−p(D):

$$\text{Frequency Score}=MIN(10,-(\log_2(MIN(p(D),1-p(D)))))$$

Two simplifying assumptions are used in steps 410, 420, 430, and 440. The first is that the highest value of the improbability measure preferably is capped at 10. Values other than 10 can also be used. The second assumption is that, although the probability measure used in the intermediate step would be zero (0) in steps 410, 420, and 430 if the browser ID, IP address, and login time were not found in the session statistics for any previously recorded sessions, that value should be non-zero to avoid having to take a logarithm of zero in the following step. Consequently, the probability value calculated in the intermediate step is preferably calculated as the higher of $1/1024$ or the actual probability number. Probability values other than $1/1024$ can be used.

Although not depicted in FIG. 4, improbability measures can also be determined for the number of clicks in the session and the duration of the session using statistics preferably stored in the session_statistics table.

To calculate an improbability measure for the number of clicks C in a session, values for C_MEAN (which is the mean number of the total clicks observed in all previous sessions stored in the session_statistics table) and C_STDDEV (which is the standard deviation from the mean of the click values stored in the session_statistics table) are determined. In an embodiment, the mean and standard deviation values are obtained using the avg( ) and stddev( ) functions of ORACLE, respectively. Next, find the standard normal cumulative distribution of C, C_MEAN and C_STDDEV. This can be found using the equation NORMSDIST(ABS(C−C_MEAN)/C_STDDEV),2), where the ABS function refers to the absolute value. The improbability measure for the number of clicks is then calculated as MIN(10,−LOG(1−NORMSDIST(ABS(C−C_MEAN)/C_STDDEV),2)).

To calculate an improbability measure for the duration D of a session, values for D_MEAN (which is the mean value of the duration observed in all previous sessions stored in the session_statistics table) and D_STDDEV (which is the standard deviation from the mean of the duration values for all sessions stored in the session statistics table) are determined. The duration value for a session is determined, in an embodiment, by determining the difference between last_time and login time for each previous session. In an embodiment, the mean and standard deviation values are obtained using the avg( ) and stddev( ) functions of ORACLE, respectively. Next, find the standard normal cumulative distribution of D, D_MEAN and D_STDDEV. This can be found using the equation NORMSDIST(ABS(D−D_MEAN)/D_STDDEV), 2), where the ABS function refers to the absolute value. The improbability measure for the duration is then calculated as MIN(10,−LOG(1−NORMSDIST(ABS(D−D_MEAN)/D_STDDEV),2)).

Because the calculations of standard normal cumulative distribution can be computationally intensive, those of ordinary skill in the art will appreciate that canned PERL modules or pre-computed tables may be used in addition to the Oracle Statistics package or other resources.

In step 450 of FIG. 4, a composite score is calculated. The purpose of the composite score is to provide a quantitative measure of how improbable, or anomalous, the user's login statistics are from the historical statistics for the user. In an embodiment, the composite score is preferably calculated by taking the average of the Network, Browser, Time of Day and Frequency scores. As a first example, if the Network Score is 10, the Browser Score is 10, the Time of Day Score is 2.3 and the duration score is 1.7, the composite score would be 6.0. The same result can be used by multiplying each of the scores by a weighting factor of 0.25 and simply adding the weighted scores.

Those of ordinary skill in the art will readily perceive that there are any number of other ways that a composite score can be created from the Network, Browser, Time of Day and Frequency scores, that other scores can be used in conjunction with one or more of these scores, and that one or more of the scores can be weighted differently than the other scores.

In step 460 of FIG. 4, a custom-configured score is calculated according to an embodiment. Preferably a financial institutions can adjust the level of identity risk it is willing to tolerate, and this can be adjusted by providing a custom-configured score. For example, a financial institution could create a custom-configured score based on the average of the Network Score and the Browser Score; other custom-configured scores also can be used based on session statistics or other factors.

Returning to FIG. 3, step 320 compares the composite score computed in step 450 and the custom-configured score computed in step 460, if any, to one or more unusual activity thresholds. The thresholds can be custom-configured to the financial institution's preference to allow the financial institution to adjust the amount and types of identity risk it is willing to tolerate. In an embodiment, the unusual activity threshold value is 7.5. A financial institution may use a threshold of 6.0 to trigger additional authentication more often, and a financial institution that has been frequently exposed to "phishing" attacks may use the Unusual Login Activity Report to adjust weighted factors to target potential phishing. Yet another alternative would be to have a second threshold (such as, preferably, when the Browser and Network scores are both 10) so that additional authentication is required whenever one of the thresholds is exceeded. Those of skill in the art will readily perceive that other threshold values, or combinations of thresholds, can be used. If the composite score calculated in step 450, or the custom-configured score calculated in step 460, exceeds any threshold, a Threshold Violation Condition is detected and the next step is step 322 in FIG. 3. If there is no Threshold Violation Condition detected, control passes to step 330 in FIG. 3, discussed below.

Returning to FIG. 3, step 322 in an embodiment is reached after a Threshold Violation Condition. In step 322, a report describing suspicious login activity is generated and provided to the financial institution preferably by encrypted email and/or online via a website, preferably in real-time. Real-time, in this context, means at or about the time the condition is detected, as opposed to the daily reports, described below, which are prepared and sent to all financial institutions on a regular basis. Those of skill in the art will appreciate that other methods of alerting suspicious activity can be used, including by way of example cell phone or pager alerts.

Figure 5:
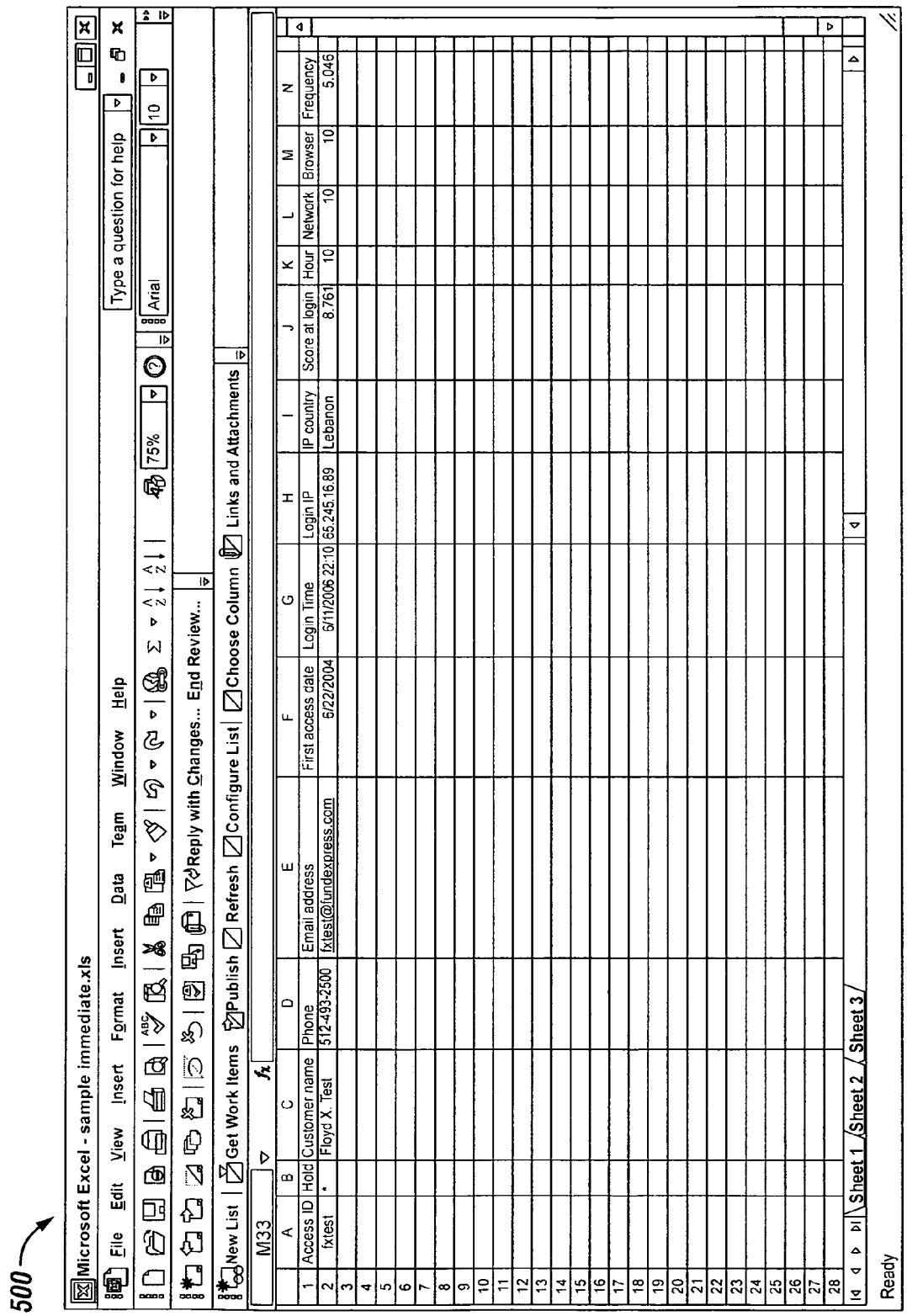
FIG. 5 is an image of an exemplary version of an immediate or real-time unusual login activity report according to an embodiment of the invention.

FIG. 5 shows an exemplary version of an immediate or real time Unusual Login Activity Report 500 sent to the financial institution in the event of a Threshold Violation Condition. The Unusual Login Activity Report 500 preferably reports the following: access ID; whether or not the end user trying to access the system is in temporary DISABLED status due to, for example, inability to log in during an additional authentication process; phone, email address; first access date; Login Time; Login IP; IP Country; Score at Login, which is the composite score calculated in step 306; the Time of Day Score computed in step 430 as described above; the Network Score computed in step 410 as described above; the Browser Score computed in step 420 as described above; and the Frequency Score computed in step 440 as described above. The Unusual Login Activity Report 500 preferably can be configured to show additional information such as a combination of scores, including preferably a combination of the Network Score and Browser Score.

Step 324 in FIG. 3 is reached, in an embodiment, after a Threshold Violation Condition has been detected. In step 324, the customer_properties table is queried to determine whether additional authentication is required in the event of a Threshold Violation Condition. If no additional authentication is required, in an embodiment the user is allowed to proceed beyond the login page and is cleared for full access to the host site 120, and the Internet Banking (IB) site, as shown in step 326. If additional authentication is required, the next step is step 328, discussed below, which evaluates the timing of the request for additional authentication.

Step 330 is reached when there is no Threshold Violation Condition detected in step 320. In step 330, the customer_properties table is queried to determine whether additional authentication is required even in the absence of a Threshold Violation Condition. If additional authentication is not required in the absence of a Threshold Violation Condition, in a preferred embodiment the user is allowed to proceed beyond the login page and is cleared for full access to the host site 120, as shown in step 332. If additional authentication is required, the next step is step 328.

In step 328 of an embodiment, the institution_properties table is queried to determine whether additional authentication is required at the login page, i.e., before the user is granted access to the Internet Banking site, or whether the user will be granted access to the Internet Banking site but additional authentication will be required only when the user seeks access to one or more transaction pages. If additional authentication is required at the login page, the next step will be step 340. If additional authentication is deferred until the user seeks access to a transaction page, the next step will be step 370, described below.

In step 340, the customer_properties table is queried to determine what kind of additional authentication is required. In an embodiment of the invention, the financial institution can require, as additional authentication methods, that the user provide an answer to a security question or a one-time personal identification number (PIN), or the user can be presented (at the additional authentication screen) with the option of either providing the one-time PIN or answering the security question. Those of ordinary skill in the art will readily perceive that other additional authentication options, including but not limited to sending a PIN using text or voice to a phone number or as a text message to a cell phone or pager or in conjunction with a hardware token, can be required or presented as an option in this step 340, and that other methods are available to determine which additional authentication option is required, including random selection, restriction of options based on prior failures to satisfy additional authentication tests, or selection of a particular authentication option based on one or more of the scores calculated in step 306. If the security question option is selected, the next step is step 351, as discussed below. If the one-time PIN option is selected, the next step is 342.

In step 342 of an embodiment, the selected additional authentication option is a one-time PIN. The customer table is queried to see if there is an email address associated with the user ID. If not, it is not possible to complete the additional authentication, and the user is informed, in step 346, that an email address and security question are required to access the Internet Banking system. If there is an email address associated with the user ID, the next step is step 343 where, preferably, a one-time PIN is generated using any number of techniques known to those of skill in the art and emailed to the email address associated with the user ID. In step 350, the login processing system queries the user for the one-time PIN. If the user enters the one-time PIN that was sent to the email address associated with the user ID, the user is allowed to proceed beyond the login page and is cleared for full access to the Internet banking site, as shown in step 352. If the user is unable to enter the one-time PIN in step 350, the user is not allowed access to the Internet Banking system and is not allowed to proceed beyond the login page. In an embodiment, the system records the date and time of the test and the fact that this user ID has failed an additional authentication test.

The next step is step 360 in which, in an embodiment, the system checks to determine whether the user has previously failed an additional authentication test. If there are a predetermined number of failures to satisfy an additional authentication test within a pre-determined time interval, preferably 3 times in 24 hours, the user ID is disabled for a predetermined period of time, preferably 24 hours, and all access is denied, as shown in step 362. If not, the user can attempt to begin the login sequence at step 303 again.

In step 351 of an embodiment of the invention, the additional authentication option selected is a security question. The Customer Configuration Settings are queried to determine whether there is a security question associated with this user ID. If there is no security question, it is not possible to complete the additional authentication, and the user is informed, in step 346, that an email address and security question are required to access the Internet banking system. Otherwise, the user is presented with an additional authentication screen that displays the security question associated with the user ID.

If the user answers the security question correctly in step 356, the user is allowed to proceed beyond the login page and is cleared for full access to the Internet banking site, as shown in step 358. Otherwise, the next step preferably is step 360, as described above.

Step 370, in an embodiment, comes after step 328, and is reached if additional authentication is not required to enter the host site but is required to enter a transaction page. In step 370, whenever the user attempts to access a transaction page, the institution_properties table is queried to determine whether this particular transaction page requires additional authentication. If the transaction page does not require additional authentication, the user is allowed access to the transaction page (shown in step 372), and the next step returns to step 370. If the transaction page requires additional authentication, the next step is step 340, described above. In an embodiment, the financial institution can elect to require additional authentication before proceeding with some or all of these transactions: bill pay, transfer funds, cash management, wire transfers for retail customers, finance transactions, user account update pages, and security setting modifications. Those of ordinary skill in the art will readily appreciate that additional authentication can be required for other types of transactions or inquiries.

Also provided, in an embodiment, is regular reporting capability for unusual login activity. FIG. 6 shows an exemplary version of a regular, preferably daily, Unusual Login Activity Report 600. Report 600 lists all users with a predetermined minimum number of previous logins, preferably 20 to 100, who had session activity the previous day. The regular Unusual Login Activity Report 600 preferably reports the following: access ID; whether or not the person trying to access the system is in temporary DISABLED status due to, for example, inability to log in during an additional authentication process; phone, email address; first access date; Login Time; Login IP; IP Country; Score at Login, which is the composite score calculated in step 306; the Time of Day Score computed in step 430 as described above; the Network Score computed in step 410 as described above; the Browser Score computed in step 420 as described above; the Frequency Score computed in step 440 as described above; a Click Score; Duration Score; and whether the user has bill paying privileges. The regular Unusual Login Activity Report 600 preferably can be configured to show additional information such as a combination of scores, including, by way of example only, a combination of the Network Score and Browser Score. The report can be emailed to the financial institution or posted on a website or other resource for download or viewing by the financial institution.

An embodiment is configurable. Configurable options preferably include the following: (i) whether to require additional authentication never, based on a Threshold Condition Violation, or always; (ii) whether to require additional authentication for particular predetermined transactions; (iii) different thresholds for retail and commercial customers; (iv) choice of security question or one-time PIN (or option of either) as security questionnaire; (v) customizable content to educate or remind customers of security requirements or to customize additional authentication pages; (vi) fraud-prevention devices such as account number masking for reports and online display on the secure website; and (vii) custom fields for unusual login activity reports. Those of ordinary skill in the art will understand that other configuration options are possible, and that the system could be designed so that all, or none of the configuration options apply to selected user IDs.

Those of skill will recognize that the techniques of the embodiments described herein may be implemented to advantage in a variety of sequential orders and that the invention may be generally implemented in magnetic media such as disks, tapes and CD-ROMs or other storage media for introduction into a system for mitigating the risk of fraud in Internet banking. In such cases, instructions for executing the steps described herein in an Internet banking system will be embedded in the media.

Although many embodiments have been described in detail, it will be apparent to those skilled in the art that many embodiments taking a variety of specific forms and reflecting changes, substitutions and alterations can be made. The described embodiments illustrate the scope of the claims but do not restrict the scope of the claims.

The invention claimed is:

1. A method, comprising:
receiving from a remote site a request for access to an online banking site associated with a financial institution, said request having satisfied a first authentication requirement associated with a customer of the financial institution and said request having two or more attributes, wherein the attributes comprise at least a browser ID of the remote site;
employing a processor associated with a site to calculate, based at least in part on the two or more attributes, a plurality of scores, wherein the plurality of scores comprises two or more of a network score, a browser score, a time of day score, or a frequency score;
employing the processor associated with the site to calculate a composite score based at least in part on a weighted improbability measure for each of the plurality of scores or an average of the plurality of scores;
employing the processor associated with the site to calculate a custom-configured score, wherein the custom-configured score indicates an amount and a type of identity risk specified by the financial institution; and
mitigating the risk of fraud in online banking based at least in part on conditioning approval of the request on satisfaction of a second authentication requirement on whether the composite score exceeds the custom-configured score based at least in part on a report generated in real-time.

2. The method of claim 1, wherein the measure of improbability is based on a plurality of previous online banking transactions by the customer.

3. The method of claim 1, further comprising reporting the composite score to the financial institution.

4. The method of claim 1, wherein the site is the online banking site associated with the financial institution.

5. The method of claim 1, wherein the two or more attributes comprise the following:
the Internet network address of the remote site;
the browser footprint of the remote site;
the time of day of the request; or
the time since the last online banking transaction by the customer.

6. The method of claim 5, wherein the request for access seeks initial access to the online banking site associated with the financial institution.

7. The method of claim 5, wherein the two or more attributes further comprise one or more of the following:
presence of a persistent cookie; or
referrer ID.

8. The method of claim 5, wherein the request for access seeks access to a transaction page within the online banking site associated with the financial institution.

9. The method of claim 8, wherein the two or more attributes further include one or more of the following:
number of clicks in an end user session; or
duration of session.

10. A method comprising:
receiving from a remote site a request for access to an online banking site associated with a financial institution;
employing a processor associated with a site to determine that the request is unusual based on the improbability of occurrence of a plurality of attributes of the request, wherein the plurality of attributes comprise at least a browser ID of the remote site, wherein determining that the request is unusual comprises:
calculating, based at least in part on the plurality of attributes, a plurality of scores, wherein the plurality of scores comprises two or more of a network score, a browser score, a time of day score, or a frequency score, and
calculating an improbability measure for each one of the network score, the browser score, the time of day score, and the frequency score, and wherein a composite score is calculated based at least in part on a weighted improbability measure for each of the plurality of scores or an average of the plurality of scores; and
reporting the request to the financial institution;
employing the processor associated with the site to calculate a custom-configured score, wherein the custom-configured score indicates an amount and a type of identity risk specified by the financial institution; and
mitigating the risk of fraud in online banking based at least in part on conditioning approval of the request on whether the composite score exceeds the custom-configured score based at least in part on a report generated in real-time.

11. The method of claim 10, wherein the request is reported to the financial institution in real time.

12. The method of claim 10, further comprising refusing access until at least two authentication requirements have been satisfied.

13. The method of claim 10, further comprising creating a composite score, the composite score comprising a weighted improbability measure for each one of the plurality of attributes.

14. The method of claim 13, wherein the plurality of attributes of the request comprises a first attribute and a second attribute, the second attribute being different from the first attribute, wherein the first attribute and the second attribute are selected from a group consisting of: an Internet network address of the remote site, a browser footprint of the remote site, the time of day of the request, the time since a previous access to the online banking site, the number of clicks in an end user session, the duration of a session, and a referrer ID.

15. A system, comprising:
a server comprising an authentication module wherein the authentication module includes instructions for:
receiving from a remote site a request for access to an online banking site associated with a financial institution;
mitigating the risk of fraud in online banking based at least in part on determining that the request is unusual based on the improbability of occurrence of a plurality of attributes of the request, wherein the plurality of attributes comprise at least a browser ID of the remote site, wherein determining that the request is unusual comprises:
calculating, based at least in part on the plurality of attributes, a plurality of scores, wherein the plurality of scores comprises two or more of a network score, a browser score, a time of day score, and a frequency score,
calculating a composite score based at least in part on a weighted improbability measure for each of the plurality of scores or an average of the plurality of scores,
calculating a custom-configured score, wherein the custom-configured score indicates an amount and a type of identity risk specified by the financial institution, and conditioning approval of the request on whether the composite score exceeds the custom-configured score based at least in part on a report generated in real-time; and reporting the request to the financial institution.

16. The system of claim 15, wherein the authentication module further includes instructions for denying the request unless two or more authentication requirements are met.

17. A system, comprising:
a session statistics module that computes a plurality of scores based at least in part on session attributes associated with a request for access to an online banking web site associated with a financial institution, wherein the session attributes comprise at least a browser ID of a remote site, and the session statistics module further computes the plurality of scores, wherein the plurality of scores comprise two or more of a network score, a browser score, a time of day score, or a frequency score, a composite score based at least in part on a weighted improbability measure for each of the plurality of scores or an average of the plurality of scores, and a custom-configured score, wherein the custom-configured score indicates an amount and a type of identity risk specified by the financial institution; and an additional authorization module for mitigating the risk of fraud in online banking that requires satisfaction of two or more authentication requirements before allowing access to the online banking site, wherein at least one of the two or more authentication requirements comprises conditioning approval of the request on whether the composite score exceeds the custom-configured score based at least in part on a report generated in real-time.

18. The system of claim 17, further comprising a reporting module that reports a plurality of session attributes and the improbability measure to the financial institution.

19. A system, comprising:
a server comprising:
a processor; and
a memory containing instructions that are executed by the processor for:
receiving from a remote site a request for access to an online banking site associated with a financial institution, said request having satisfied a first authentication requirement associated with a customer of the financial institution and said request having a plurality of attributes, wherein the plurality of attributes comprise at least a browser ID of the remote site;

calculating a plurality of scores based at least in part on the plurality of attributes, wherein the plurality of scores comprises two or more of a network score, a browser score, a time of day score, or a frequency score;

calculating a composite score based at least in part on a weighted improbability measure for each of the plurality of scores or an average of the plurality of scores;

calculating a custom-configured score, wherein the custom-configured score indicates an amount and a type of risk specified by the financial institution; and mitigating the risk of fraud in online banking based at least in part on conditioning approval of the request on satisfaction of a second authentication requirement on whether the composite score exceeds the custom-configured score based at least in part on a report generated in real-time.

20. A computer readable storage medium comprising instructions for:
receiving from a remote site a request for access to an online banking site associated with a financial institution, said request having satisfied a first authentication requirement associated with a customer of the financial institution and said request having a plurality of attributes, wherein the plurality of attributes comprise at least a browser ID of the remote site;

calculating a plurality of scores based at least in part on the plurality of attributes, wherein the plurality of scores comprises two or more of a network score, a browser score, a time of day score, or a frequency score;

calculating a composite score, wherein the composite score is calculated based at least in part on a weighted improbability measure for each of the plurality of scores or an average of the plurality of scores;

calculating a custom-configured score, wherein the custom-configured score indicates an amount and type of identity risk specified by the financial institution; and mitigating the risk of fraud in online banking based at least in part on conditioning approval of the request on satisfaction of a second authentication requirement on whether the composite score exceeds the custom-configured score based at least in part on a report generated in real-time.

* * * * *

UNITED STATES PATENT AND TRADEMARK OFFICE
CERTIFICATE OF CORRECTION

| | | |
|---|---|---|
| PATENT NO. | : 8,788,419 B2 | Page 1 of 1 |
| APPLICATION NO. | : 11/648066 | |
| DATED | : July 22, 2014 | |
| INVENTOR(S) | : M. Samuels et al. | |

It is certified that error appears in the above-identified patent and that said Letters Patent is hereby corrected as shown below:

In the Specification

Column 6, line 52, please change "embodiment passcode" to -- embodiment, passcode --

Signed and Sealed this
Ninth Day of December, 2014

Michelle K. Lee
*Deputy Director of the United States Patent and Trademark Office*